United States Patent [19]
Noda et al.

[11] Patent Number: 5,301,041
[45] Date of Patent: Apr. 5, 1994

[54] OPTICAL INFORMATION RECORDING AND REPRODUCING APPARATUS

[75] Inventors: Kazuo Noda, Yokohama; Yasuyuki Kimura, Kawagoe, both of Japan

[73] Assignee: Nippon Conlux Co., Ltd., Tokyo, Japan

[21] Appl. No.: 994,945

[22] Filed: Dec. 22, 1992

[30] Foreign Application Priority Data

Dec. 26, 1991 [JP] Japan ................... 3-345466

[51] Int. Cl.$^5$ .............................................. H04N 1/04
[52] U.S. Cl. .............................. 358/480; 369/44.32
[58] Field of Search ............... 369/58, 54, 44.32; 358/401, 480, 474, 484

[56] References Cited

U.S. PATENT DOCUMENTS

| | | | |
|---|---|---|---|
| 4,748,610 | 5/1988 | Nakata | 369/44.32 |
| 5,184,343 | 2/1993 | Johann et al. | 369/54 |
| 5,235,575 | 8/1993 | Han | 369/44.32 |

FOREIGN PATENT DOCUMENTS

| | | | |
|---|---|---|---|
| 0014329 | 1/1988 | Japan | 369/44.32 |
| 0016422 | 1/1988 | Japan | 369/44.32 |

*Primary Examiner*—Edward L. Coles, Sr.
*Assistant Examiner*—Jerome Grant, II
*Attorney, Agent, or Firm*—Spensley Horn Jubas & Lubitz

[57] ABSTRACT

In an optical information recording and reproducing apparatus, the recording operation is interrupted when an information pit, dust, scratch, stain, etc. is present on an optical recording medium. However, the recording operation is resumed and kept continued when a dust, scratch, stain, etc. other than the information pit is present on the medium. The apparatus comprises a double recording detecting circuit for detecting a pseudo double recording signal generated by a dust, scratch, stain, etc. on the medium at a period of a recording operation; and a recording signal supply circuit for interrupting the recording operation when the double recording detecting circuit detects the pseudo double recording signal to switch the recording period to a monitor period, for maintaining the interruption of the recording operation when a real double recording signal generated by an information pit is detected at the monitor period, and for resuming the recording operation when the real double recording signal generated by an information pit is not detected at the monitor period. After the recording operation has been resumed and further when the pseudo double recording signal generated by a dust, scratch, stain, etc. still remaining on the medium is detected, the monitor and recording periods are repeated alternately. However, after the medium has become free from a dust, scratch, stain, etc. finally and therefore the real and pseudo double recording signals are not both generated, the recording operation is kept continued normally.

2 Claims, 3 Drawing Sheets

OPTICAL INFORMATION RECORDING AND REPRODUCING APPARATUS

BACKGROUND OF THE INVENTION

Field of the Invention

The present invention relates to an optical information recording and reproducing apparatus, and more specifically to an optical information recording and reproducing apparatus which can prevent other information data from being over-recorded in an information recording area on an information recording medium, which is referred to as double recording prevention apparatus.

Description of the Prior Art

In the optical information recording and reproducing apparatus, information data are recorded or reproduced to or from an optical information recording medium (referred to as medium, simply hereinafter) by irradiating a laser beam generated from an optical head upon the medium. When information data are recorded, new information data must be recorded only in the information recording portion of the medium where any information data are not yet recorded, without doubly recording information data in the information recording portion of the medium where some information data have been already recorded. This is because when doubly recorded, the already recorded and newly recorded information data are both damaged, with the result that both the data cannot be reproduced. To overcome this double recording problem, conventionally, the presence or absence of information data; that is, the presence or absence of information pits (referred to as pits, simply hereinafter) formed on the medium is detected by use of the optical head. When the presence of pits is determined, the recording operation is interrupted for prevention of the double recording.

In this prior art method, however, since the presence or absence of pits is detected on the basis of change in intensity of the laser beam reflected from the medium, in case the surface of the medium is stained with a dust or damaged by a scratch, since the intensity of the laser beam reflected from the medium also changes, the presence of pits is erroneously recognized, thus resulting in a problem in that the information data recording operation is interrupted in spite of the fact that the data can be recorded in the non-recorded portions of the medium.

In more detail, FIGS. 3(a) to (d) show wave forms related to the interruption of information recording operation of the apparatus. FIG. 3(a) represents the wave form of a laser beam signal for recording or reproducing information data to or from the medium, in which the level $L_1$ denotes a high signal level required to record an information data and the level $L_2$ denotes a low signal level required to reproduce an information data. FIG. 3(b) represents the wave form of a signal of laser light reflected from the medium and indicative of a recorded information pattern, in which the level $L_3$ denotes a high signal level obtained when the laser beam is reflected from the portion other than pits and the level $L_4$ is a low signal level obtained when the laser beam is reflected from a pit, respectively.

Further, FIG. 3(c) represents the wave form of a signal of laser light reflected from the medium and indicative of the presence of a dust, scratch, stain, etc., in which the level $L_5$ denotes a low level obtained when the laser beam is reflected from a stained or damaged surface of the medium. FIG. 3(d) represents the wave form of a signal reproduced from the medium, in which the level $L_6$ denotes a sampled received-light level indicative of that the laser light reflected from the medium is sampled and the level $L_7$ denotes a non-sampled (input-off) level indicative of that the laser light reflected from the medium is not sampled; that is, the reproducing signal is cut off.

Further, in FIGS. 3(a) to (d), the high level $L_6$ of the sampled received-light level is synchronized with the low level $L_2$ for the data reproduction shown in FIG. 3(a), and the low level $L_7$ of the non-sampled (input-off) level is synchronized with the high level $L_1$ for the data recording shown in FIG. 3(a). Further, the high level signal $L_6$ is outputted only when the intensity of the laser light reflected from the medium is lower than a predetermined slice level due to the presence of a pit, dust, scratch, stain, etc., and not outputted when higher than the predetermined slice level due to the absence of a pit, dust, scratch, stain, etc. Therefore, if a pit, dust, scratch, stain, etc. is not present on the surface of the medium, both the levels $L_6$ and $L_7$ become equal to each other.

With reference to FIGS. 3(a) and (d), the double recording can be prevented as follows: in response to the recording signal as shown in FIG. 3(a), information data are doubly recorded on the medium for a short double recording time period $T_1$ irrespective of the presence or absence of pits. Of course, although the information data are damaged due to the double recording during this short time period $T_1$, the error can be sufficiently relieved by an error correcting circuit. However, since the double recording is discriminated on the basis of the reproducing signal (double recording signal) as shown in FIG. 3(d), the recording operation is interrupted at an interruption point $t_1$. Here, since this reproducing signal is generated in the same way even when a dust, scratch, stain, etc. is present on the medium, the recording operation is interrupted. Once interrupted, since the recording operation is kept interrupted, there exists a problem in that it is impossible to resume the recording operation, as long as the recording operation is not restarted manually.

SUMMARY OF THE INVENTION

Accordingly, the object of the present invention is to solve the above-mentioned problem such that the recording operation is kept interrupted when the medium is stained by a dust or damaged with a scratch. In other words, it is the object of the present invention to provide an optical information recording and reproducing apparatus which can interrupt the recording operation only when pits are present on the medium, and continue recording operation when a dust, scratch, stain, etc. other than the pits is present on the medium.

To achieve the above-mentioned object, the optical information recording and reproducing apparatus according to the present invention comprises: detection means for detecting a pseudo double recording signal generated by a dust, scratch, stain, etc. on an information recording medium at a period of an information recording operation; interrupt means for interrupting the information recording operation when said detecting means detects the pseudo double recording signal, to switch the recording operation period to a monitor period; maintain means for maintaining the interruption of the information recording operation when a real double recording signal generated by an information pit is detected at the monitor period; resume means for resuming the information recording operation when the real double recording signal generated by an information pit is not detected at the monitor period; and after the recording operation has been resumed and when the pseudo double recording signal generated by a dust, scratch, stain, etc. still remaining on the medium is detected, the monitor and recording periods being repeated alternately; and after the medium has become free from a dust, scratch, stain, etc. and therefore the real and pseudo double recording signals are not both generated, the recording operation being kept continued normally.

In the optical information recording and reproducing apparatus of the present invention, when the real or pseudo double recording operation signal is detected at the recording period, the recording operation is interrupted, and the recording period is switched to the monitor period. When a pit signal is detected at the monitor period, the recording operation is kept interrupted; and when the pit signal is not detected, the monitor period is returned to the recording period. In this case, however, when a dust, scratch, stain, etc. still remains on the medium, since the pseudo double recording signal is detected, the recording period is switched to the monitor period again. As described above, the monitor and recording periods are repeated, and after the real and pseudo double recording signals are both not detected during recording period, the normal recording operation is resumed and further kept continued.

Whenever the real or pseudo double recording signal is detected, the above-mentioned operation is repeated to prevent the pseudo double recording operation, thus enabling the normal recording operation.

In the optical information recording and reproducing apparatus of the present invention, whenever the real or pseudo double recording signal is detected at the recording period, the recording period is switched to the monitor period to discriminate whether the double recording is the real double recording due to the presence of a pit or the pseudo double recording due to the presence of a dust, scratch, stain, etc. In the case of the real double recording, the recording operation is interrupted; and in the case of the pseudo double recording, the recording operation is kept continued. Therefore, there exists such an effect that it is possible to discriminate the real double recording due to the presence of a pit from the pseudo double recording due to the presence of a dust, scratch, stain, etc. or vice versa, thus eliminating the originally unnecessary interruption of the recording operation.

DETAILED DESCRIPTION OF THE PREFERRED EMBODIMENTS

Figure 1:
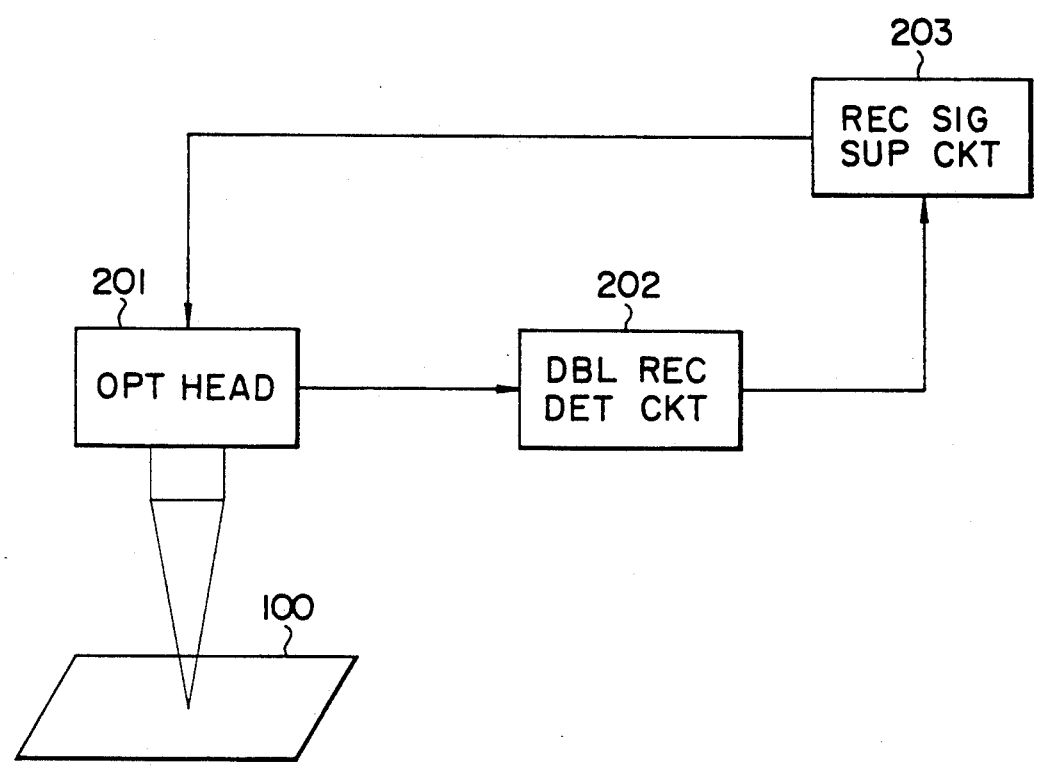
FIG. 1 is a block diagram showing an embodiment of the optical information recording and reproducing apparatus of the present invention.

FIG. 1 is a block diagram showing an embodiment of the present invention. In this embodiment, information data are recorded on an optical card (medium) 100 by an optical beam emitted from an optical head 201 when the optical card 100 is being reciprocated. The optical head 201 transmits a light (e.g. laser) beam with two optical powers of a recording level and a reproducing level alternately to irradiate the medium with a light beam two different power levels. In the reproducing level, the optical head 201 detects the intensity of the light reflected from the medium, and transmits the detected signal to a double recording detection circuit 202.

When a double recording signal is detected by the double recording detection circuit 202, the double recording detection circuit 202 outputs an interrupt signal to a recording signal supply circuit 203 to interrupt the recording operation of the recording signal supply circuit 203, so that the optical head 201 is switched to a monitor period at which a light beam with a constant optical power of the reproducing level is irradiated upon the medium.

When the double recording detection circuit 202 detects a pit signal, the operation of the recording signal supply circuit 203 is kept interrupted.

When the double recording detection circuit 202 does not detect a pit signal at the monitor period, the detection circuit 202 outputs a signal to the recording signal supply circuit 203 to return the monitor period to the recording period. That is, the recording signal supply circuit 203 is activated again, so that the optical head 201 starts to irradiate the light beam with two optical powers of the recording level and the reproducing level alternately upon the medium, to continue the information recording operation.

However, in the case where a dust, scratch, stain, etc. is present on the medium, the double recording detection circuit 202 detects a pseudo double recording signal, so that the optical head 201 is switched to the monitor period again.

FIGS. 2(a) to (f) show various wave forms of the signals for assistance in explaining the operation of the optical information recording and reproducing apparatus of according to the present invention.

FIG. 2(a) represents the wave form of a light beam signal for recording or reproducing information data on or from the medium, in which the level $L_1$ denotes a high signal level required to record information data and the level $L_2$ denotes a low signal level required to reproduce an information data. FIG. 2(b) represents the wave form of a signal of light reflected from the medium and indicative of a recorded information pattern, in which the level $L_3$ denotes a high signal level obtained when the light beam is reflected form the portion other than pits and the level $L_4$ is a low signal level obtained when the light beam is reflected from a pit, respectively. FIG. 2(c) represents the wave form of a signal reproduced from the medium, in which the level $L_6$ denotes a sampled received-light level indicative of that the light reflected from the medium is sampled and the level $L_7$ denotes a non-sampled (input-off) level indicative of that the light reflected from the medium is not sampled; that is, the reproducing signal is cut off.

Further, in FIGS. 2(a) to (c), the high level $L_6$ of the sampled received-light level is synchronized with the low level $L_2$ for data reproduction shown in FIG. 2(a), and the low level $L_7$ of the non-sampled (input-off) level is synchronized with the high level $L_1$ for data recording shown in FIG. 2(a). Further, the high level signal $L_6$ is outputted only when the intensity of the light reflected from the medium is lower than a predetermined slice level due to the presence of a pit, dust, scratch, stain, etc., and not outputted when higher than the predetermined slice level due to the absence of a pit, dust, scratch, stain, etc. Therefore, if a pit, dust, scratch, stain, etc. is not present on the surface of the medium, both the levels $L_6$ and $L_7$ become equal to each other.

FIG. 2(d) represents the wave form of a signal of a light beam irradiated upon the medium in the same way as in FIG. 2(a), and FIG. 2(e) represents the wave form of a signal of light reflected from the medium and indicative of the presence of a dust, scratch, stain, etc., in which the level $L_5$ denotes a low level obtained when the light is reflected from a stained or damaged surface of the medium at a low reflection factor.

FIG. 2(f) represents the wave form of a signal reproduced from the medium, in which the level $L_{61}$ denotes a sampled received-light level indicative of that the light reflected from the medium is sampled and the level $L_{71}$ denotes a non-sampled (input-off) level indicative of that the light reflected from the medium is not sampled; that is, the input of the reproducing signal is cut off.

In the optical information recording and reproducing apparatus of the present invention, first the recording operation is effected for a short recording period $T_1$. Where some information data are already recorded on the medium, since the reproducing signal (double recording signal) as shown in FIG. 2(c) is obtained, the double recording is discriminated, and the recording operation is interrupted at the interrupt point $t_1$, and the recording operation is switched to the monitor operation at the period $T_2$.

Under these conditions, however, since the light beam is kept irradiated upon the medium at the reproducing level of $L_2$, it is possible to obtain the reproducing signal of the levels $L_{62}$ and $L_{72}$ from the medium. Further, in this case, since the light beam of the recording level $L_1$ is not irradiated upon the medium, no sampling light beam is received. Further, although the double recording is effected during the short time period $T_1$ and therefore the information data are damaged, there exists no problem because these damaged data can be relieved by the error correcting circuit.

On the other hand, when the light beam is irradiated upon the medium by the reproducing signal as shown in FIG. 2(d) under the condition that a dust, scratch, stain, etc. is present on the medium, since the reproducing signal of the levels $L_{61}$ and $L_{71}$ as shown in FIG. 2(f) can be obtained, the double recording is discriminated and the recording operation is interrupted at the interrupt point $t_1$. However, since the irradiation of the level $L_2$ is kept continued, it is possible to obtain the reproducing signal of the constant level of $L_{63}$, as shown in FIG. 2(f), at the monitor $T_2$.

Figure 2:
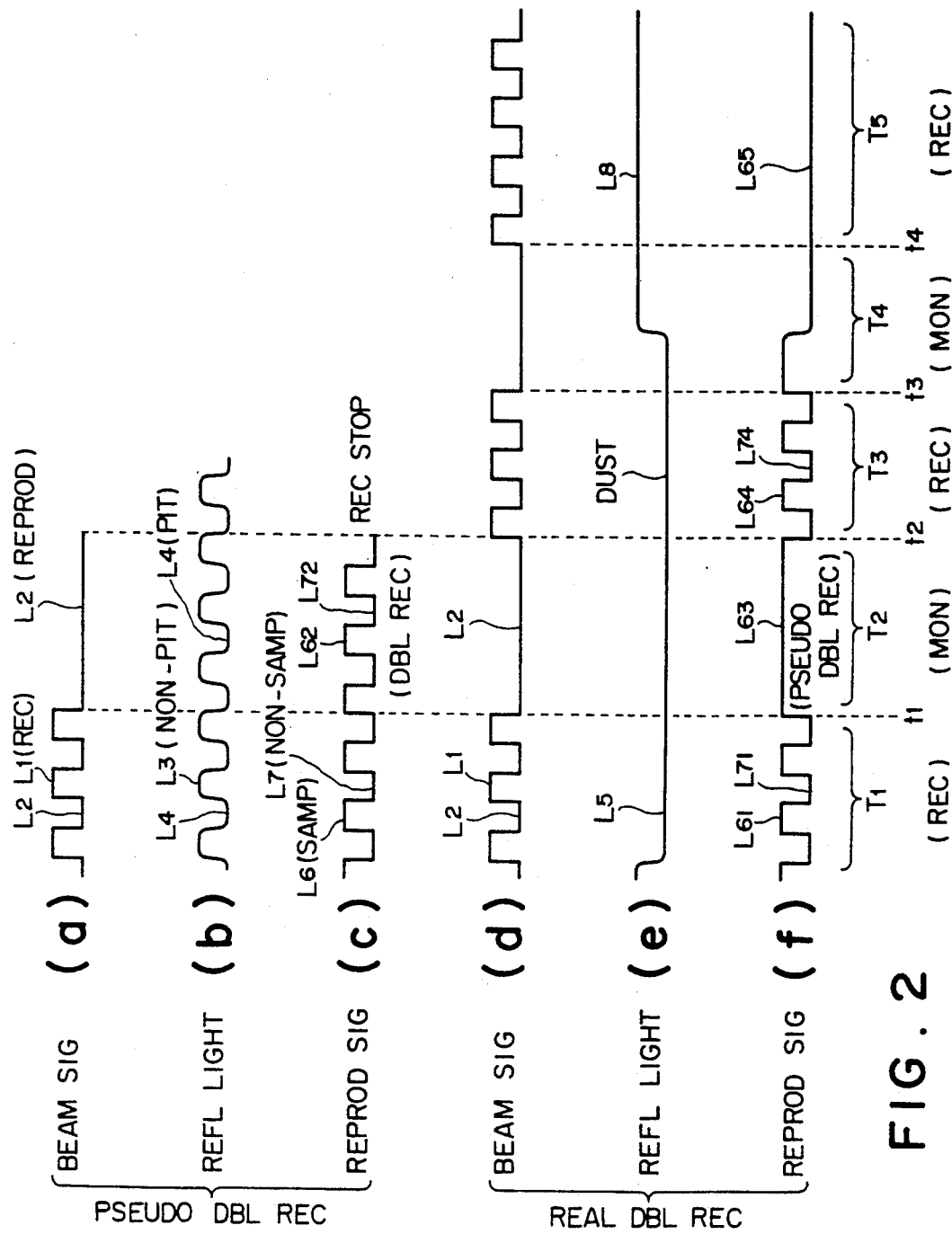
FIGS. 2(a) to (f) are wave form representations for assistance in explaining various signals related to the double recording prevention operation of the optical information recording and reproducing apparatus of the present invention.
Figure 3:
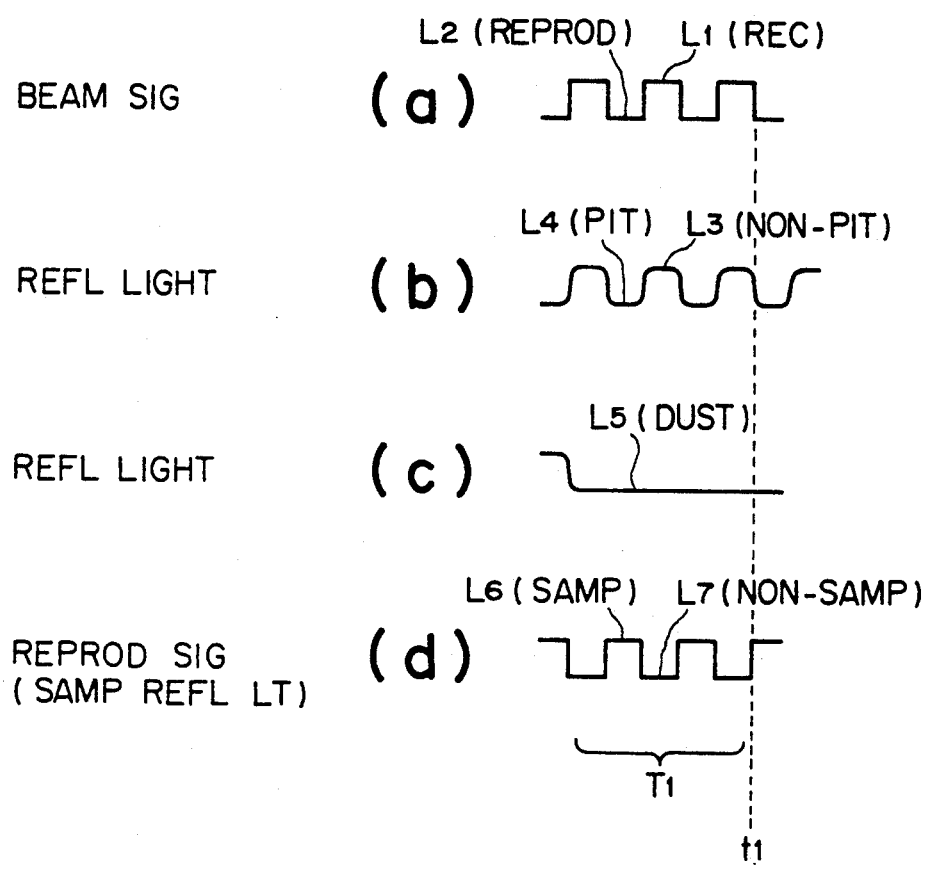
FIGS. 3(a) to (d) are wave form representations for assistance in explaining various signals related to the information recording interruption operation of a prior art optical information recording and reproducing apparatus.

The discrimination of whether the double recording is the real double recording or the pseudo double recording (caused by a dust, scratch, stain, etc.) can be made on the basis of the reproducing signal obtained after the interrupt point $t_1$ shown in FIG. 2. In more detail, in the case of the real double recording, the reproducing signal changes between the two levels $L_{62}$ and $L_{72}$ at the monitor period $T_2$ after the interrupt point $t_1$ as shown in FIG. 2(c). However, in the case of the pseudo double recording, it is possible to obtain the reproducing signal of the constant level $L_{63}$ at the monitor period $T_2$ as shown in FIG. 2(f).

Therefore, when the reproducing signal whose level changes between the levels $L_{62}$ and $L_{72}$ is obtained, since the double recording operation is discriminated to be the real operation, the recording operation is interrupted. On the other hand, when the reproducing signal whose level is constant as shown by the level $L_{63}$ is obtained, since the double recording operation is discriminated to be the pseudo operation, the recording operation is resumed at the resume point $t_2$ after the time period $T_2$ has elapsed, thus the monitor period being switched to the recording period again.

In this recording period $T_3$, if the medium is still damaged by a dust, scratch, stain, etc., since the reproduced signal whose level changes alternately between $L_{64}$ and $L_{74}$ can be obtained, the double recording detection circuit 202 discriminates that the double recording is still kept and therefore interrupts the recording operation, thus the recording period being switched to the monitor period again at another interrupt point $t_3$.

As described above, while the interruption and the resumption of the recording operation are repeated, the medium becomes finally free from a dust, scratch, stain, etc., so that the reflection factor of the medium becomes large and therefore the signal level of the light reflected from the medium increases at the monitor period $T_4$ as shown by the reflected light level $L_8$ in FIG. 2(e). Therefore, even when the recording signal supply circuit 203 resumes the recording operation at the resumption point $t_4$, since it is possible to obtain the reproducing signal of a constant level $L_{65}$ as shown in FIG. 2(f), the recording signal supply circuit 203 continues the recording operation without interruption. As described above, the apparatus can switch the monitor operation to the normal recording operation after the light beam has passed through the portion damaged by a dust, scratch, stain, etc.

What is claimed is:

1. An optical information recording and reproducing apparatus, comprising:
   detection means for detecting a pseudo double recording signal generated by a dust, scratch, stain, etc. on an information recording medium and a real double recording signal generated by an information pit at a period of an information recording operation;
   interrupt means for interrupting the information recording operation when said detecting means detects the pseudo double recording signal, to switch the recording operation period to a monitor period;
   maintain means for maintaining the interruption of the information recording operation when the real double recording signal is detected at the monitor period;
   resume means for resuming the information recording operation when the real double recording signal generated an information pit is not detected at the monitor period; and
   after the recording operation has been resumed and when the pseudo double recording signal generated by a dust, scratch, stain, etc. still remaining on the medium is detected, the monitor and recording periods being repeated alternately; and after the medium has become free from a dust, scratch, stain, etc. and therefore the real and pseudo double recording signals are not both generated, the recording operation being kept continued normally.

2. The optical information recording and reproducing apparatus of claim 1, wherein received light signals reflected from the medium are sampled on the basis of a predetermined slice level at the monitor period to discriminate the real double recording operation from the pseudo double recording operation or vice versa.

* * * * *